United States Patent

[11] 3,550,797

[72] Inventor Ronald W. Nickel
604 Glenview Ave., Oconomowoc, Wis. 53066
[21] Appl. No. 810,102
[22] Filed Mar. 25, 1969
Division of Ser. No. 552,765, May 25, 1966, Patent No. 3,447,700.
[45] Patented Dec. 29, 1970

[54] METHOD OF COLLECTING MATERIAL BY MEANS OF DUMP TRUCKS
6 Claims, 5 Drawing Figs.
[52] U.S. Cl. ................................................ 214/152
[51] Int. Cl. .......................................... B65g 67/02
[50] Field of Search ........................................ 214/38.41, 152, 302, 303

[56] References Cited
UNITED STATES PATENTS
| | | | |
|---|---|---|---|
| 2,826,318 | 3/1958 | Beasley | 214/302X12 |
| 3,059,789 | 10/1962 | Bowles | 214/41 |
| 3,147,870 | 9/1964 | Urban et al. | 214/302 |

Primary Examiner—Robert G. Sheridan
Attorney—Cyril M. Hajewski

ABSTRACT: A trucking arrangement in which a small dump truck is adapted to dump its contents into a larger truck for hauling to a remote destination. The small dump truck is provided with a coupling means that engages the larger trucks when the dump body on the small truck is elevated. This couples the two trucks together so that they cannot separate during the transfer operation and the trucks are held in relative positions so that the large truck receives the contents being discharged out of the small truck.

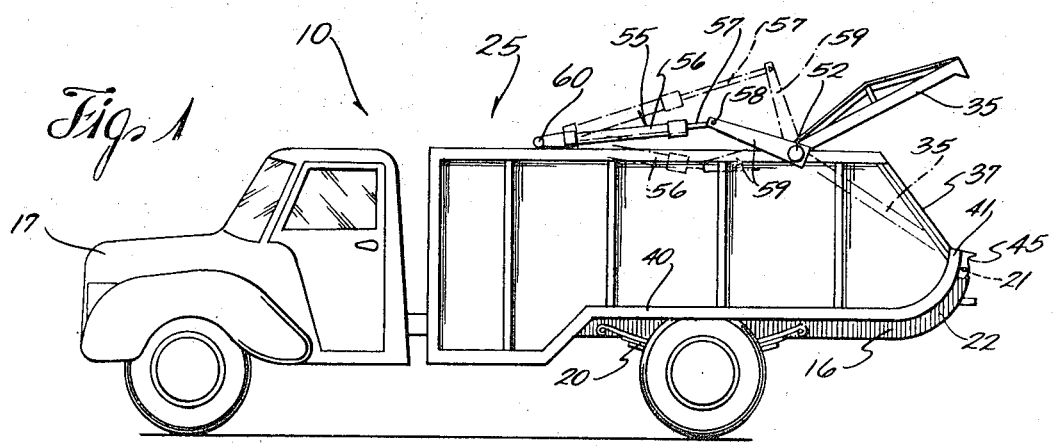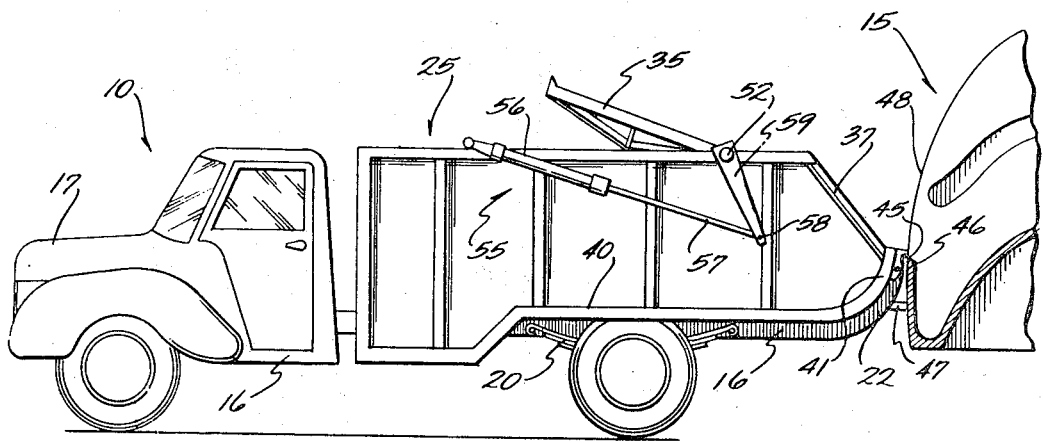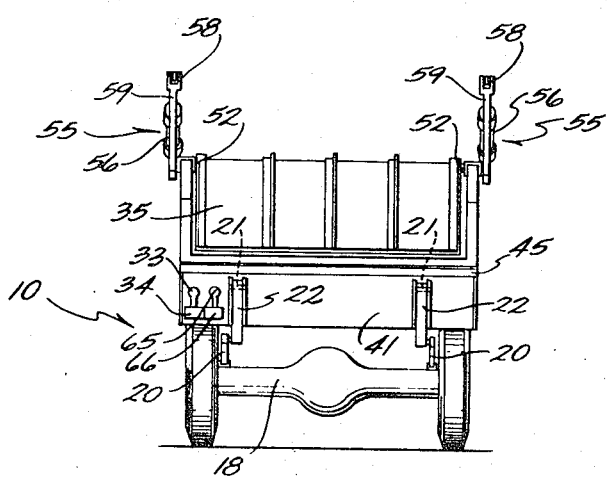

3,550,797

1

METHOD OF COLLECTING MATERIAL BY MEANS OF DUMP TRUCKS

This is a division of application Ser. No 552,765 filed May 25, 1966, now Pat. No. 3,447,700.

BACKGROUND OF THE INVENTION

The present invention relates to a method of collecting refuse in which the refuse is picked up at its source by small trucks and the small trucks dump their contents into a large truck called the mother truck which will haul a large load of the refuse to its ultimate destination which may be at a distant location.

It frequently occurs where material must be hauled a long distance that it is possible to use only a small truck for picking up the material. Such situation often exists in the hauling of refuse and particularly when refuse is being collected from individual residences or small commercial establishments. The maximum load that may be driven over the streets in such areas is usually strictly limited so that the size of the truck is limited accordingly. Moreover it is inconvenient and uneconomical to employ a large refuse truck for making the small individual collections of refuse. On the other hand, it is uneconomical to drive the small pickup truck with a light load of refuse to the discharge point when its ultimate destination is a substantial distance from the pickup area.

The present invention provides the ideal solution to this problem by providing relatively small dump trucks for making the individual collection of refuse at the source and especially adapting these small refuse trucks to discharge the refuse contained therein directly into a relatively large truck referred to as the mother truck. With this arrangement a single mother truck can service a number of the small trucks, and when filled can make the long trip with a heavy load to deliver its contents to the ultimate destination.

SUMMARY

It is an object of the invention to provide an improved method of collecting refuse whereby small dump trucks are employed to make the individual collections and these dump trucks dump their contents directly into a large mother truck which delivers the refuse to its ultimate destination. The invention includes an improved arrangement whereby the small dump truck becomes coupled to the larger truck while the small dump truck is dumping its contents into the larger truck to prevent the escape of the refuse during the dumping operation.

In order to effect the transfer of the refuse from the small truck to the mother truck, the small truck is backed against an opening in the mother truck. The small truck body is then pivoted upwardly to dump its contents and as it does so, a semicylindrical bar engages a lip on the mother truck to couple the two trucks together. Since the truck bodies are spring mounted, they readily yield to the forces that may occur to depress the large truck and elevate the small truck during the dumping operation. When the dumping operation is completed, the truck body is returned to its loading position, and as it moves toward this position, the coupling mechanism is automatically released so that each truck can proceed independently of the other.

DESCRIPTION OF THE DRAWING

The foregoing and other objects of this invention which will become more fully apparent from the following detailed description of an embodiment thereof may be achieved by the apparatus herein described by way of example in connection with the illustration of its structural components in the accompanying drawings, in which:

FIG. 1 is a view in side elevation illustrating a refuse truck incorporating the features of the present invention with the truck body and packing door being shown in the loading position for receiving the refuse that is to be moved;

FIG. 2 is the same view as FIG. 1 but the packing door is shown full retracted to its dumping position to provide clearance for dumping the contents of the truck into the mother truck;

FIG. 3 is a rear view of the truck illustrated in FIGS. 1 and 2 except that the packing door is depicted in its closed positions;

Figure 4:
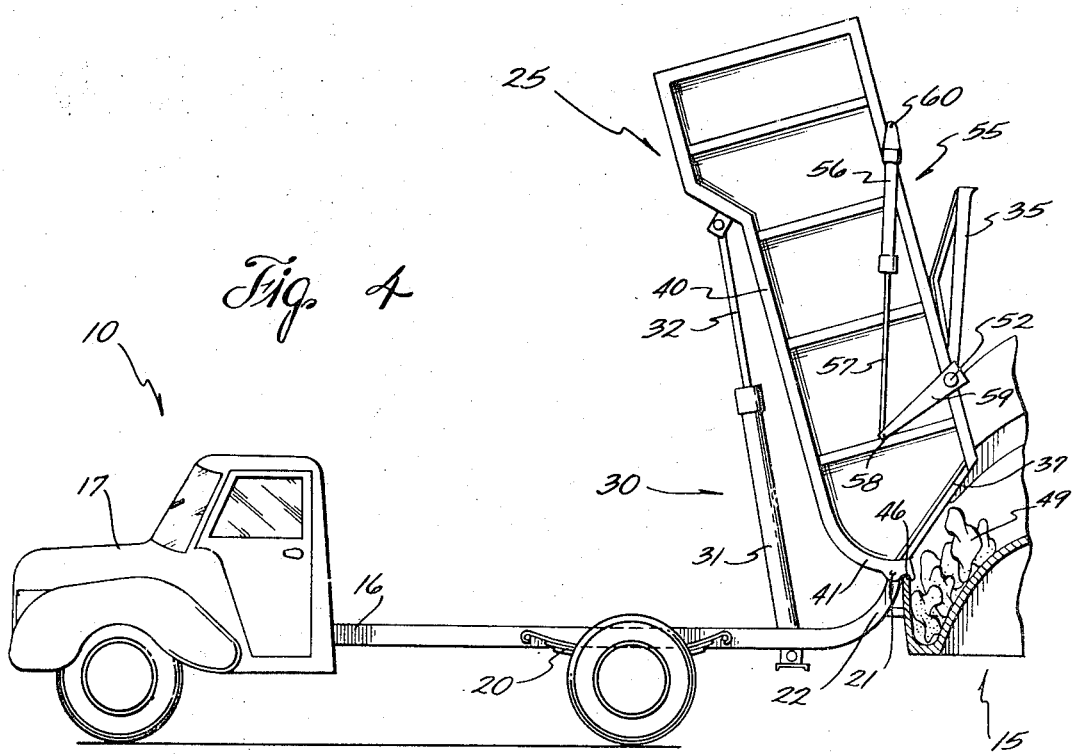
FIG. 4 is another side elevational view of the truck shown in FIG. 1 but with the truck body raised to its dumping position and shown dumping its contents into a mother truck.

Reference is now made more particularly to the drawings and particularly to FIG. 2 which illustrates a small pickup truck generally identified by the reference numeral 10 positioned relative to its larger mother truck which is generally identified by the reference numeral 15, with only the rear end of the mother truck 15 being depicted in the drawing. The small pickup truck is especially adapted to travel into residential areas and move into the locations where relatively small quantities of refuse are collected. The relatively small pickup truck 10 is also especially adapted to dump its load of refuse into the larger mother truck 15 which will deliver it to its ultimate destination. This arrangement provides a small refuse truck for convenient collection of light loads of refuse and yet avoids the necessity of the relatively small pickup truck hauling the refuse over long distances to deliver the refuse to its ultimate destination. It results in much more economical operation while providing superior service.

The pickup truck 10 comprises a conventional frame 16 and cab 17 with the frame 16 being supported on a rear axle 18 by a spring suspension 20. A body 25 is mounted on the frame 16 and is especially adapted for carrying refuse. To this end, it is fully enclosed and is carried on the frame 16 by a pair of spaced pivot pins 21 for pivotal movement between the horizontal loading position illustrated in FIG. 1 and a substantially vertical position for dumping its contents in the manner depicted in FIG. 4.

Figure 5:
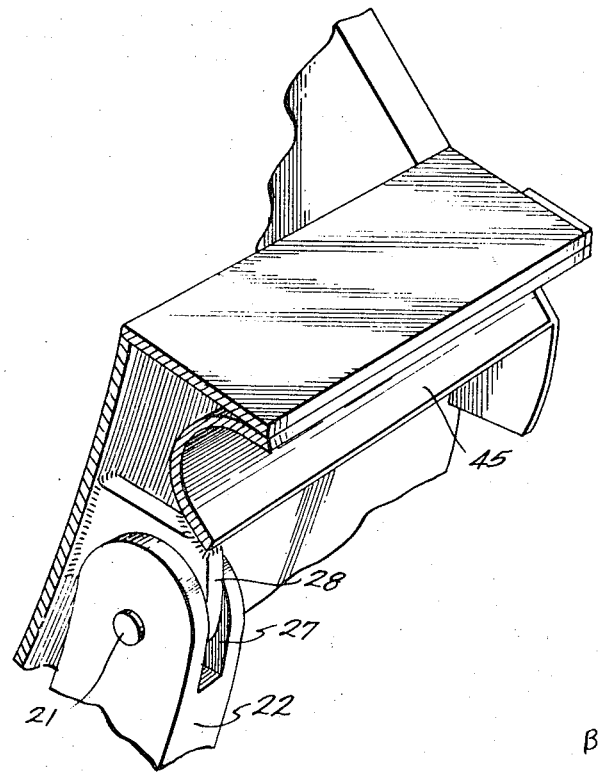
FIG. 5 is an enlarged detail perspective view of the coupling member shown on the truck in FIG. 1.

As best seen in FIG. 5, each of the two side beams of the frame 16 are provided with upwardly curved rear ends 22. The rearmost extremity of each of these curved ends 22 is provided with a longitudinally extending slot 27 for receiving a pivot plate 28 that is secured to the body 25. Both end portions 22 and their associated plates 28 are provided with suitable holes for receiving the pin 21 to pivotally pivotably support the body 25 for pivotal movement relative to the frame 16. In FIG. 5, the pivotal connection between the left side beam of the frame 16 and the body 25 is shown in detail. The identical structure is provided on the right beam of the frame 16 for pivotably supporting the body 25 on both sides.

A hydraulic piston and cylinder mechanism 30 is mounted underneath the truck for actuating the body 25 in its pivotal movement in conventional manner as shown in FIG. 4. To this end, the cylinder 31 has one end pivotably connected to the frame 16. A connecting rod 32 extends from the opposite end of the cylinder 31 and has its free end pivotably connected to the underside of the body 25. A piston (not shown) is slidably contained within the cylinder 31 and is secured to the connecting rod 32. Hydraulic pressure is directed into either end of the cylinder 31 under the control of a regulating handle 33 which actuates a valve 34 for controlling the flow of hydraulic pressure into the cylinder 31. Movement of the handle 33 to the left, as viewed in FIG. 3, will direct hydraulic pressure into the cylinder 31 for raising the body 25 to its dumping position shown in FIG. 4. On the other hand, movement of the handle 33 in a rightward direction as viewed in FIG. 3, will direct hydraulic pressure into the cylinder 31 for lowering the body 25 to its loading position as illustrated in FIG. 1. The regulating handle 33 is shown in its neutral position in FIG. 3.

The body 25 is completely enclosed except for a rear opening 37 which may be closed by a packing door 35. A floor plate 40 of the body 25 has its rear end 41 curved upwardly about a radius that complements the curved ends 22 of the frame 16 so that the rear end 41 of the body 25 will nest into the curved upper surface of the two side beams of the frame 16.

The upwardly curved rear end 41 of the body 25 serves the very important function of retaining liquids within the interior of the body 25. Some of the refuse that is collected may have liquids in it which have an unpleasant odor, and it is important that they be prevented from escaping out of the truck. It has been the practice to provide sealed doors for retaining these liquids but such seals are subjected to malfunctioning and require frequent maintenance. The upwardly curved portion of the body 25 retains the liquids within the dump body 25 without the necessity of such seals and from the following description it will be apparent that despite the upwardly curved rear end of the truck body 25 it causes the liquids to be conveniently discharged from within the interior of the body 25 when the load is dumped.

The pivot plates 28 are mounted at the upper portion of the upwardly curved rear end 41 so that when the body 25 is raised to the dumping position illustrated in FIG. 4, the upper edge of the curved rear end 41 is moved downwardly while the remaining portion of the curved end 41 is pivoted upwardly with the body 25. With this arrangement, and the curved surface at the rear end of the floor 40, the liquids readily flow from the curved rear end 41 through the rear opening 37 in the body 25 so that any liquid in the truck body 25 is readily discharged therefrom.

As previously mentioned, the pickup truck 10 is especially adapted to dump its contents into a relatively larger mother truck 15 so that the delivery of the refuse to its ultimate destination may be carried out by the larger vehicle. In order to insure complete transfer of the contents of the small truck into the mother truck without any escape of the small pickup truck 10 and the mother truck 15 are coupled to each other during he dumping of the contents of the small truck into the mother truck. Such coupling is accomplished automatically by the elevating of the body 25 of the pickup truck 10 toward its dumping position. To this end, the dump body 25 is provided with a semicylinderical coupling bar 45 which extends across the width of the body 25 at its rearmost end for engagement with an upper edge 46 of a tail plate 47 provided on the other truck 15. The upper edge 46 defines the bottom of a loading opening 48 provided in the body of the mother truck 15. It will be noted from the views in FIGS. 1 and 2 that the semicylindrical coupling bar 45 is at the uppermost end of the curved portion 41 of the body 25 so that it also comprises the rearmost end of the truck. Moreover, the coupling bar 45 extends across the width of the truck with its axis in a substantially horizontal position directly above the horizontal pivot pins 21 about which the dump body 25 pivots in its dumping operation. Accordingly, as the dump body 25 is pivoted upwardly from the horizontal loading position illustrated in FIG. 2 to the substantially vertical dumping position illustrated in FIG. 4, the cylindrical bar 45 will pivot with the truck body 25 approximately 90°. Since the pivot pins 21 are located beneath the coupling bar 45, the latter will move downwardly in an arcuate path as the dump body 25 is raised so that the coupling bar 45 moves into engagement with the upper edge 46 of the tail plate 47 on the mother truck 15. The pivot pins 21 are normally located slightly below the upper edge 46 of the tail plate 47 so that as the coupling bar 45 moves downwardly in its arcuate movement with the pivotal movement of the dump body 25, it engages the upper edge 46, and as the elevation of the dump body 25 continues, a downward pressure is applied upon the tail plate 47. Since the entire frame 16 is mounted on the spring suspension 20, the frame 16 yields to this pressure and rises to accommodate it. Of course, the frame of the mother truck 15 likewise is mounted on a spring suspension so that it too may yield to such pressure. As a result, a very secure coupling engagement is achieved between the pickup truck 10 and the mother truck 15. Although strong forces may exist tending to separate the trucks, they remain coupled together during the dumping operation so that there is very little possibility of the escape of refuse during its transfer from the pickup truck 10 to the mother truck 15.

In operation, when it is desired to transfer a load from the pickup truck 10 to the mother truck 15, the pickup truck 10 is backed toward the mother truck 15 so that the rear ends of both trucks are in immediate proximity to each other and in substantial alignment. Any minor misalignments will be readily accommodated by reason of the spring mounting of both truck bodies which will enable them to yield a limited amount to the various forces which may be applied. After the two trucks are positioned back to back, the regulating handle 33 of the pickup truck 10 is shifted to direct hydraulic pressure into the cylinder 31 for raising the dump body 25. As the body 25 raises, the coupling bar 45 moves downwardly in its arcuate path, as previously mentioned, and engages the upper edge 46 of the mother truck 15 to couple the two trucks together. As the dump body 45 continues to be raised, the coupling engagement between the coupling bar 45 and the upper edge 46 of the mother truck 15 becomes progressively more secure and the frame 16 of the pickup truck 10 raises to accommodate the pressures applied to the tail plate 47 of the mother truck 15. When the dump body 25 is in its fully raised position as depicted in FIG. 4, its opening 37 is actually past the opening 48 and within the body of the mother truck 15 as shown in FIG. 4 so that there is very little, if any, possibility of the refuse 49 escaping during the transfer operation. When the transfer has been completed, the regulating handle 33 is again shifted to direct hydraulic pressure into the cylinder 31 for lowering the dump body 25 to its horizontal loading position. As the dump body lowers, the coupling bar 45 is moved upwardly in its arcuate path to gradually release the upper edge 46. By the time the dump body 25 arrives at its lowermost loading position, the coupling member 45 has completely released the upper edge 46 of the tail plate 47 so that the two trucks are automatically uncoupled and each may proceed independently of the other. The mother truck 15 is a conventional rear loading refuse truck that is used extensively for collecting refuse and hauling it to a particular destination.

The packing door 35 is supported by the body 25 for pivotal movement with the rotation of a pair of stub shafts 52 one of which extends from each side of the door 35 and is journaled in the associated side of the truck body 25. Thus, one stub shaft 52 is journaled in one side of the truck body 25 and the other stub shaft 52 is journaled in the opposite side of the truck body 25 with the two stub shafts 52 being in axial alignment. One of the stub shafts 52 is secured to one edge of the packing door 35 while the other stub shaft 52 is secured to the opposite edge of the same packing door 35. As a result, the packing door 35 is carried by the body 25 for pivotal movement about the axis of the two stub shafts 52.

The packing door 35 is actuated in its pivotal movement by a pair of piston and cylinder mechanisms generally identified by the reference numeral 55. The two piston and cylinder mechanisms 55 are identical and each comprises a cylinder 56 which slidably encloses a piston (not shown) to which a connecting rod 57 is secured and extends outwardly of the cylinder 56. The extending end of each connecting rod 57 is pivotably secured by a pin 58 to a link 59, the opposite end of the link 59 being keyed to one of the stub shafts 52.

Two links 59 are provided with each being keyed to one of the two stub shafts 52 and each link being connected to one of the piston and cylinder mechanisms 55 for actuation thereby. One piston and cylinder mechanism is disposed on one side of the door 35 and the other is located on the opposite side. The end of each cylinder 56 which is opposite to the end from which its associated connecting rod 57 extends is pivotably secured to the top of the dump body 25 by a pin 60 so that the cylinder 56 is free to pivot in a vertical plane along the side of the body 25.

The packing door 35 serves the double function of closing the opening 37 as well as to pack the refuse that is dumped through the opening 37 into the interior of the body 25 and to compress the refuse within the body. The door 35 is shown in FIG. 1 in its normal open position to clear the opening 37 for loading refuse into the truck. When the refuse accumulates in the vicinity of the opening 37 it is only necessary for the operator to shift a regulating handle 65 to actuate a cooperating valve 66 for directing hydraulic pressure into both cylinders 56 to force the connecting rods 57 outwardly and thereby pivot the links 59 in a clockwise direction as viewed in FIG. 1 for pivoting the door 35 downwardly into the interior of the body 25 for forcing the refuse that is dumped therein into the forward portion of the dump body 25. As the body 25 fills with refuse, the actuation of the door 35 in this manner serves to compress the refuse to increase the capacity of the truck. In FIG. 1, as previously mentioned, the door 35 is shown in its normal open position to render the opening 37 accessible to the operator for loading refuse into the truck. When the door 35 is pivoted downwardly to the position represented by the broken lines in FIG. 1, the opening 37 is closed to prevent the escape of the contents of the body 25. However, the connecting rod 57 may be forced outwardly to a greater extent to pivot the door 35 into the truck beyond the position represented by the broken lines in FIG. 1 to force the refuse into the interior of the body 25 and compress it.

The opening 37 of the body 25, of course, must be open when the contents are being dumped into the mother truck 15. However, when the packing door 35 is in the open position illustrated in FIG. 1, it interferes with the upward movement of the dump body 25 when the pickup truck 10 is coupled to the mother truck 15. During the raising of the dump body 25 if the packing door 35 were allowed to remain in the position shown in FIG. 1 during the raising of the dump body 25, it would strike the body of the mother truck 15. It is therefore necessary to pivot the packing door 35 in a counterclockwise direction from the position illustrated in FIG. 1 to locate it against the top of the dump body 25 in the manner illustrated in FIG. 2. Normally, if the packing door 35 is in the open position illustrated in FIG. 1, and the connecting rod 57 is extended outwardly of the cylinder 56, the packing door 35 will be pivoted downwardly to its closed position into the interior of the dump body 25. However, the same extension of the connecting rod 57 may also produce a pivotal movement of the packing door 35 in the opposite direction to the position shown in FIG. 2. This is accomplished by merely forcing the pins 58 and their associated mechanisms downwardly from the position illustrated by solid lines in FIG. 1 to a point beneath the center as represented by the broken lines in FIG. 1. The pins 58 are shown located above the central position in FIG. 1 and then will normally remain in this position, due to the weight of the door 35, to actuate the packing door 35 downwardly from the position shown in FIG. 1 in response to extension of the connecting rods 57. However, there is sufficient play in the various connections and the connecting rods 57 may be forced further into the cylinders 56 so that if the operator will grasp either one of the cylinders 56 of a link 59 and force it downwardly or push the door 35 upwardly in a counterclockwise direction as viewed in FIG. 1, the pins 58 will move downwardly beneath the central position to the position represented by the broken lines in FIGS. 1.

The operator need apply the downward force to only one of the links 59 and the other will move with it by reason of their connection to each other through the two stub shafts 52 and the door 35. Both pins 58 will shift to a location beneath the center and subsequent extension of the connecting rods 57 will then not move the links 59 in a clockwise direction, but rather in a counterclockwise direction to pivot the packing door 35 upwardly from the position shown in FIG. 1 into engagement with the upper surface of the dump body 25 as illustrated in FIG. 2. When the packing door 35 is thus located, sufficient clearance is provided with respect to the body of the mother truck 15 so that the dump body 25 of the pickup truck 10 is free to be raised to its dumping position as illustrated in FIG. 4.

After the dumping operation has been completed, the packing door 35 may be returned to its open position illustrated in FIG. 1 by directing hydraulic pressure into the cylinders 56 for retracting the connecting rods 57 into the cylinders. When the connecting rods 57 are fully retracted, the pins 58 will be raised to the above center position by the weight of the door 35 acting through the links 59. The pins 58 and their associated mechanism will therefore move to the position indicated by the solid lines in FIG. 1 as a result of the retraction of the connecting rods 57 into the cylinders 56. Then, even though the connecting rods 57 are moved in the opposite direction to extend them out of the cylinders 56, the packing door 35 will continue to rotate in the same direction from the position illustrated in FIG. 1 to the interior of the truck body 25.

With this arrangement, reasonable size position and cylinder mechanisms may be employed for obtaining a complete pivotal positioning of the packing door 35 from a position well within the interior of the truck body 25 to a position wherein the door 35 rests upon the top exterior surface of the truck body 25. When the packing door 35 is in the position represented by the broken lines in FIG. 1 to close the opening 37, the opening may be opened for loading by retracting the connecting rods 57 into the cylinders 56. When the connecting rods 57 are fully retracted, further pivotal movement of the packing door 35 in the same counterclockwise direction can be obtained by reversing the operation of the piston and cylinder mechanisms 55, if the pins 58 and their associated mechanisms are forced downwardly below the center position before the connecting rods 57 are extended from the cylinders 56. To reverse the operation, a similar procedure is completed. The packing door 35 will be moved in a clockwise direction from the position shown in FIG. 2 by retracting the connecting rods Then, when the connecting rods 57 are fully retracted, the weight of the door 35 will force the pins 58 and their associated mechanisms above the central position as illustrated by solid lines in FIG. 1 and then, reverse operation of the piston and cylinder mechanisms 55 to extend the connecting rods 57 will continue the pivotal movement of the packing door 35 in the same clockwise direction to the interior of the dump body 25.

From the foregoing detailed description of the present invention, it will be readily understood that an improved method of collecting refuse has been provided with the method being carried out by an improved refuse pickup truck that is especially adapted to dump its contents into a larger mother truck for hauling to its ultimate destination.

I claim:
1. A method of collecting refuse from a plurality of locations which comprises: collecting the refuse from the individual locations and depositing it into a plurality of small motor dump trucks having dump bodies; and dumping the refuse from said dump bodies directly into a relatively larger motor truck for delivery to its ultimate destination.

2. A method of collecting refuse according to claim 1 including coupling each of said small dump trucks to said larger motor truck during the dumping of the refuse from said small truck dump bodies into said larger truck.

3. A method of collecting refuse according to claim 2, wherein said coupling step is completed by the initiation of said dumping step and is terminated by the end of said dumping step.

4. A method of collecting refuse according to claim 2 wherein: the dump bodies of said small dump trucks are pivoted upwardly to complete said dumping step and are pivoted downwardly to return said dump bodies to a loading position, and said upwardly pivotal movement of said dump bodies completes said coupling step; and said downwardly pivotal movement terminates coupling step to release said small trucks from said larger truck.

5. A method of collecting refuse according to claim 4, including the step of shifting a packing door on said larger truck to a clearance position to eliminate interference with said upward pivotal movement of the dump bodies of said small dump trucks during said dumping operation.

6. A method of collecting refuse according to claim 1; including the step of shifting a packing door on said larger truck to a clearance position to eliminate interference with the dumping step being performed by said small motor dump trucks.